United States Patent Office 3,347,787
Patented Oct. 17, 1967

3,347,787
PROCESS OF PURIFYING OR RECOVERING MINE DRAINAGE WATERS AND THE LIKE
John Cecil Rhodes, Old Limekiln Road, R.D. 1, Doylestown, Pa. 18901
No Drawing. Filed Aug. 30, 1965, Ser. No. 483,829
8 Claims. (Cl. 210—50)

The present invention relates to a process of purifying mine drainage water or waters of similar composition and to render such water fit for discharge into streams without polluting the latter and also to render such water fit for further use.

Among the major impurities or contaminants of mine drainage water are ferrous sulphate [$FeSO_4$] and sulphuric acid [$H_2SO_4$], and also ferric sulphate

[$Fe_2(SO_4)_3$]

Hence, mine drainage water discharged into streams will so contaminate the stream as to destroy fish, vegetation and life in general which otherwise exists in ordinary streams and rivers. In like manner, mine drainage water contaminates the sub-surface water otherwise available for use through wells or springs, thereby rendering such well water or spring water unfit for ordinary use for domestic and industrial purposes.

The object of my invention is both to so purify mine drainage water and the like as to make it releasable into streams or rivers without polluting the latter and also to protect the adjacent or near adjacent subterranean water from like pollution, and also to make such mine drainage water in and of itself usable as a source of water supply both for domestic and industrial purposes.

My invention consists of a process of so treating mine drainage water, either in situ or any near adjacent impounding basins such as abandoned quarries, strip-mine excavations, dams and the like, as to precipitate out the iron content thereof and to neutralize and precipitate the sulphuric acid content thereof, with the result that the water will thereby be nearly neutral if not indeed neutral and free or substantially free of iron and sulphate (or sulphur) ions.

By my process other metals, particularly toxic metals, as, for instance, copper are similarly removed.

The process of my invention comprises subjecting mine drainage water and the like to the action of an excess of metallic iron and an excess of air in intimate contact with the water and for a sufficient length of time to complete or substantially complete the following reactions of this process. By the term "excess," as used here, I mean in quantities substantially in excess of the stoichiometric amounts vis-a-vis the iron-sulphate and sulphuric-acid content of the water.

By my process the added metallic iron reacts with the sulphuric acid to form ferrous sulphate which oxidizes to ferric sulphate. Concurrently, namely, as this reaction gradually reduces and finally exhausts the sulphuric acid content of the water, the ferric sulphate is hydrolyzed into insoluble basic ferric sulphates whose composition may vary somewhat according to the extent of hydrolysis of the ferric sulphate, but all insoluble in the absence of sulphuric acid.

By such absorption of the sulphuric acid by the added metallic iron and the oxidation of the ferrous sulphate to ferric sulphate by the added oxygen and the hydrolysis of the ferric sulphate to the insoluble basic iron sulphates, the original sulphuric-acid content of the water (as well as the sulphuric acid) produced by the hydrolysis and the original iron content of the water are converted to insoluble basic iron sulphates, with the result that the decanted water (or the water from which such insoluble basic iron sulphates have been filtered) may then be safely released into streams or rivers or may be used directly as a source of domestic or industrial water supply.

The addition of oxygen by aeration not only oxidizes the ferrous sulphate to ferric sulphate which is thereupon hydrolyzed, but such added oxygen also serves to depolarize the iron and to facilitate the reaction between the sulphuric acid and the added metallic iron, by combining with the hydrogen which is produced in the interaction between the metallic iron and dilute sulphuric acid, which hydrogen otherwise slows down such reaction.

The reaction between the added metallic iron and sulphuric acid and the added oxygen may be represented as follows:

$$2Fe + 2H_2SO_4 + O_2 \rightarrow 2FeSO_4 + 2H_2O$$

The reaction between the ferrous sulphate in the mine drainage water and the supplied oxygen may be represented by any one of the following (and perhaps other) equations:

$$4FeSO_4 + O_2 + 3H_2O \rightarrow Fe_2(SO_4)_3 + 2Fe(OH)_3 + H_2SO_4$$
$$Fe(OH)_3 + H_2SO_4 \rightarrow FeOHSO_4 + 5H_2O$$
(soluble in acid water)
$$4Fe(OH)SO_4 + 6H_2O \rightarrow Fe_4(OH)_{10}SO_4 + 3H_2SO_4$$
(insoluble)
$$4FeSO_4 + O_2 + 8H_2O \rightarrow Fe_4(OH)_{10}SO_4 + 3H_2SO_4$$
(insoluble)

Thus, the oxidation of the ferrous sulphate converts it to any one of several basic ferric sulphates, some of which are insoluble and some of which are soluble, depending upon the pH of the water and depending upon the extent to which the hydrolysis of the ferric sulphate has proceeded. Thus, with only two OH groups in the hydrolyzed ferric sulphate, such basic ferric sulphate is still soluble, particularly in slightly acid solution. However, as the acidity of the water is further reduced by the aforementioned reaction between the sulphuric acid and the added metallic iron or as the initially soluble partially hydrolyzed ferric sulphate is further hydrolyzed, the hydrolyzed ferric sulphate becomes insoluble.

While the hydrolysis of the ferric sulphate releases a portion of the $SO_4$ content thereof to form further sulphuric acid and/or ferrous sulphate, as my process continues, the added oxygen further reacts with the ferrous sulphate to form ferric sulphate and the added metallic iron further reacts with the sulphuric acid, thereby further reducing each of these two original pollutants until all or substantially all the original iron sulphates have been converted to insoluble basic iron sulphates and either precipitated or filtered out in such form and all or substantially all the sulphuric acid and $SO_4$ ions (or other sulphur ions) have been so removed through such insoluble basic iron sulphates.

The following are counter reactions which may go on in the process to a gradually diminishing extent until all the original iron and sulphuric acid content of the water have been so removed.

The basic ferric sulphates are perhaps not definite chemical compounds, in that they vary in their OH content, and such insoluble precipitates may also include some ferric hydroxide (along with the basic ferric sulphate), and such ferric hydroxide and the basic ferric sulphate may be in some equilibrium in relation to each other in the precipitate—the exact nature of which precipitate I have not determined (and the determination of which is not essential to the practice of my process).

The added metallic iron may be supplied in the form of iron pellets or in the form of scrap iron, including discarded automobile bodies from which the combustibles have been first burnt off by incineration. The iron may be immersed in the water (and the oxygen bubbled through the water) or the water may be trickled over the ion and collected and re-circulated over the iron.

The added oxygen may be supplied by pumping compressed-air to the bottom of an impounded body of the water at many points along the bottom thereof and bubbling the air upwardly through the water. Such oxygen may also be supplied by pumping the water through a multiplicity of spray-nozzles and spraying it downwardly through the air or by pumping it over aerating towers or means, or by spraying the water over the scrap-iron and recovering the water in a sump or spool beneath the pile of scrap iron and repeatedly re-circulating and re-spraying the water through the air over the scrap iron.

Whether the added metallic iron is immersed in a body of impounded water (or in a stream of such water) and air bubbled through the water, or whether the water is pumped and re-circulated through a spraying system which sprays it through the air and over the metallic iron, the concurrent subjection of the action of the added oxygen and metallic iron is continued until susbtantially all the sulphuric-acid and $SO_4$ ion content and all the iron content of the water has been converted to insoluble basic iron sulphates in the manner hereinabove stated; such conversion being indicated by the pH of the water. When the pH of the water approaches neutrality or reaches a value of approximately 5.8 (or more), the reactions of my process are essentially completed.

The so purified water may either be decanted (after the insoluble basic iron sulphates have settled or precipitated) or the so purifier water may be passed through a filter for the removal of the basic iron sulphates (and any other suspended filterable matter). The purified water so separated from the insoluble iron sulphates may then be discharged into a stream or river or may be used directly as a source of water supply for domestic purposes.

Any copper which may be contained in the mine drainage water is in the form of copper sulphate. The added metallic iron reacts with the copper sulphate to precipitate out metallic copper and to form soluble ferrous sulphate:

$$CuSO_4 + Fe \rightarrow Cu + FeSO_4$$

The resultant ferrous sulphate likewise participates in the aforementioned reactions with added oxygen to form ferric sulphate and the latter is likewise hydrolyzed to an insoluble basic iron sulphate as the acidity of the water is reduced by the interaction of the sulphuric acid with added metallic iron as indicated above.

By my above-described process the acidity of the mine drainage water may be reduced to a point approaching neutral, as, for instance, a pH of 5.8. This is sufficiently neutral for all or substantially all domestic and industrial uses and is also sufficiently neutral for safe release into streams of water or rivers.

If the mine drainage water also contains toxic or otherwise undesirable amounts of manganese, zinc, magnesium or other metals, then I follow up the aforementioned process steps by the addition of a sufficient amount of an alkali to the water (which has been purified by the aforementioned process steps) to effect the removal of the aforementioned undesirable toxic metals by converting the original soluble salts thereof into the insoluble hydroxides, oxides, carbonates or silicates thereof, which are then precipitated or filtered out.

Thus, I add to the effluent or decanted purified water resulting from the previously described process steps by which original iron and sulphuric acid have been removed, an amount of lime, caustic soda, soda-ash or sodium silicate; just sufficient to effect the conversion of the original soluble salts of the aforementioned toxic metals to the insoluble hydroxides, oxides, carbonates or silicates thereof which are then precipitated out and from which the water may then be decanted or which insolubles may be filtered out.

A preferred embodiment of my invention is the continuous contacting of a moving stream of water with the metallic iron and the atmospheric oxygen and the continuous decantation or filter-separation of the near neutral water from the insoluble iron sulphates.

I may immerse a large mas of iron pellets or strips or a large mass of scrap-iron in a flowing stream of water, with such iron mass extending completely across the cross-section of the moving stream of water and extending a substantial distance lengthwise of the stream, and continuously aerate the stream of water in this metallic-iron zone thereof and also in the zone immediately preceding and following such zone; the velocity of the water stream and the lengthwise extent of the mass of iron being so proportioned to each other that the aforementioned reactions will be substantially completed when the stream has passed through the treatment zone.

I may also spray the water of successive columns or piles of scrap-iron or other iron particles, and collect the water at the bottom of each iron pile or column and pump the water over the succeeding pile or column of iron, and so on; the number and size of such successive piles or columns of iron particles being adjusted so that water to be recovered from the last of such series of particulated iron piles or columns will have the desired pH value or the desired freedom from the contaminating iron, sulphuric acid and sulphate ion.

Having described my invention, I claim the following:

1. The process of purifying mine drainage water and the like containing sulphates of iron dissolved therein and containing sulphuric acid, which comprises neutralizing the sulphuric acid content of such water with metallic iron and converting the iron sulphates originally contained in such water and also the iron sulphates resulting from the aforementioned acid-neutralization to insoluble iron compounds, by adding metallic iron and oxygen to such water in amounts substantially in excess of the stoichiometric proportions thereof in relation to the iron content and sulphuric acid content of the water and concurrently subjecting such water to the action of such metallic iron and oxygen until the acidity of the water has been reduced to a point approaching neutrality and the original iron content and sulphate ion content of the water have been converted to insoluble basic iron sulphates.

2. The process of purifying mine drainage water and the like containing sulphates of iron dissolved therein and containing sulphuric acid, which comprises neutralizing the sulphuric acid content of such water with metallic iron and converting the iron sulphates originally contained in such water and also the iron sulphates resulting from the aforementioned acid-neutralization to insoluble iron compounds, by immersing metallic iron in such water in an amount substantially in excess of the stoichiometric proportion thereof in relation to the sulphuric acid content and $SO_4$ content of the water and passing oxygen through such water in amounts substantially in excess of the stoichiometric proportion thereof in relation to the original iron content and sulphuric acid content of the water until the acidity of the water has been reduced to a point approaching neutrality and the original iron content and sulphate ion content of the water have been converted to insoluble basic iron sulphates.

3. The process of purifying mine drainage water and the like containing sulphates of iron dissolved therein and containing sulphuric acid, which comprises neutralizing the sulphuric acid content of such water with metallic iron and converting the iron sulphates originally contained in such water and also the iron sulphates resulting from the aforementioned acid-neutralization to insoluble iron compounds, by passing the water over metallic iron presenting a large total amount of exposed surface in the presence of air and re-circulating the water over such metallic iron in the presence of air until the acidity of the water has been reduced to a point approaching neutrality and the original iron content and sulphate ion content of the water have been converted to insoluble basic iron sulphates.

4. The process of purifying mine drainage water and the like containing sulphates of iron dissolved therein and containing sulphuric acid, which comprises neutralizing the sulphuric acid content of such water with metallic iron and converting the iron sulphates originally contained in such water and also the iron sulphates resulting from the aforementioned acid-neutralization to insoluble iron compounds, by concurrently contacting such water with metallic iron and atmospheric oxygen in amounts (of such iron and oxygen) substantially in excess of the stoichiometric proportions thereof in relation to the iron content and sulphuric acid and $SO_4$ ion content of the water until the acidity of the water has been reduced to a point approaching neutrality and the original iron content and sulphate ion content of the water have been converted to insoluble basic iron sulphates.

5. The process of purifying mine drainage water and the like containing sulphates of iron dissolved therein and containing sulphuric acid, which comprises neutralizing the sulphuric acid content of such water with metallic iron and converting the iron sulphates originally contained in such water and also the iron sulphates resulting from the aforementioned acid-neutralization to insoluble iron compounds, by continuously flowing such water through and in contact with a particulated mass of metallic iron and in contact with atmospheric oxygen, with such metallic iron and such atmospheric oxygen being in amounts greatly in excess of the stoichiometric proportions thereof in relation to the iron content and the sulphuric acid and $SO_4$ ion content of the water, until the acidity of the water down-stream of such particulated mass of metallic iron has to be reduced to a point approaching neutrality and the original iron content and sulphate-ion content of the water have been converted to basic iron sulphates.

6. The process of purifying mine drainage water and the like containing sulphates of iron dissolved herein and containing sulphuric acid, which comprises neutralizing the sulphuric acid content of such water with metallic iron and converting the iron sulphates originally contained in such water and also the iron sulphates resulting from the aforementioned acid-neutralization to insoluble iron compounds, by concurrently contacting such water with metallic iron and atmospheric oxygen in amounts (of such iron and oxygen) substantially in excess of the stoichiometric proportions thereof in relation to the iron content and sulphuric acid and $SO_4$ ion content of the water until the acidity of the water has been reduced to a point approaching neutrality and the original iron content and sulphate ion content of the water have been converted to insoluble basic iron sulphates, and separating the water and the insoluble basic iron sulphates from each other.

7. The process of purifying mine drainage water and the like containing sulphates of iron dissolved therein and and containing sulphuric acid, which comprises neutralizing the sulphuric acid content of such water with metallic iron and converting the iron sulphates originally contained in such water and also the iron sulphates resulting from the aforementioned acid-neutralization to insoluble iron compounds, by concurrently contacting such water with metallic iron and atmospheric oxygen in amounts (of such iron and oxygen) substantially in excess of the stoichiometric proportions thereof in relation to the iron content and sulphuric acid and $SO_4$ ion content of the water until the acidity of the water has been reduced to a point approaching neutrality and the original iron content and sulphate ion content of the water have been converted to insoluble basic iron sulphates, and alkalizing the resultant water just sufficiently to convert the soluble salts of toxic metals such as manganese, zinc, magnesium or the like into insoluble hydroxides, carbonates, oxides or silicates thereof by the addition thereto of the corresponding alkalizing agents.

8. The process of purifying mine drainage water and the like containing sulphates of iron dissolved therein and containing sulphuric acid, which comprises neutralizing the sulphuric acid content of such water with metallic iron and converting the iron sulphates originally contained in such water and also the iron sulphates resulting from the aforementioned acid-neutralization to insoluble iron compounds, by continuously flowing such water through and in contact with a particulated mass of metallic iron and in contact with atmospheric oxygen, with such metallic iron and such atmospheric oxygen being in amounts greatly in excess of the stoichiometric proportions thereof in relation to the iron content and the sulphuric acid and $SO_4$ ion content of the water, until the acidity of the water down-stream of such particulated mass of metallic iron has been reduced to a point approaching neutrality and the original iron content and sulphate-ion content of the water have been converted to basic iron sulphates, and alkalizing the resultant water just sufficiently to convert the soluble salts of toxic metals such as manganese, zinc, magnesium or the like into insoluble hydroxides, carbonates, oxides or silicates thereof by the addition thereto of the corresponding alkalizing agents.

References Cited

UNITED STATES PATENTS

| 2,296,423 | 9/1942 | Clark | 23—117 |
| 3,218,252 | 11/1965 | Glover et al. | 210—4 |

FOREIGN PATENTS

| 1,030,265 | 5/1958 | Germany. |

MORRIS O. WOLK, *Primary Examiner.*

MICHAEL E. ROGERS, *Examiner.*